United States Patent
Devenyi et al.

(10) Patent No.: US 6,974,386 B1
(45) Date of Patent: Dec. 13, 2005

(54) MOTOR DRIVE SYSTEM WITH WIRE-WOUND FLEXIBLE COUPLING

(75) Inventors: Gabor Devenyi, Penetanguishene (CA); James Robert Whitty, Midland (CA)

(73) Assignee: Raytheon Company, Waltham, MA (US)

(*) Notice: Subject to any disclaimer, the term of this patent is extended or adjusted under 35 U.S.C. 154(b) by 168 days.

(21) Appl. No.: 10/465,159

(22) Filed: Jun. 19, 2003

(51) Int. Cl.$^7$ .................................. F16D 3/12
(52) U.S. Cl. ....................... 464/59; 464/40; 464/60
(58) Field of Search ............... 464/58, 59, 60, 464/40; 192/41 S

(56) References Cited

U.S. PATENT DOCUMENTS

| | | | | |
|---|---|---|---|---|
| 2,573,361 A | * | 10/1951 | Rodgers, Jr. et al. | 464/58 |
| 3,146,576 A | * | 9/1964 | Wezel | 464/58 |
| 3,347,061 A | * | 10/1967 | Stuemky | 464/58 |
| 4,646,738 A | | 3/1987 | Trott | |
| 4,763,764 A | * | 8/1988 | Smith | 192/41 S |
| 4,923,462 A | | 5/1990 | Stevens | |
| 5,165,421 A | * | 11/1992 | Fleischhacker et al. | 464/58 |
| 5,288,270 A | * | 2/1994 | Ishikawa | 464/60 |
| 5,488,761 A | | 2/1996 | Leone | |
| 5,803,812 A | * | 9/1998 | Kakiuchi et al. | 464/58 |
| 5,816,923 A | * | 10/1998 | Milo et al. | 464/58 |
| 5,820,464 A | | 10/1998 | Parlato | |
| 6,220,372 B1 | * | 4/2001 | Cherry | 464/58 |
| 6,375,573 B2 | * | 4/2002 | Romano | 464/58 |
| 6,726,568 B2 | * | 4/2004 | Tanaka | 464/58 |

* cited by examiner

Primary Examiner—Aaron Dunwoody
(74) Attorney, Agent, or Firm—William C. Schubert; Karl A. Vick

(57) ABSTRACT

A motor drive system includes a motor having a rotary motor output shaft, a driven component, and a flexible coupling connecting the motor output shaft to the driven component. The flexible coupling is a helix formed of a first wound wire. The helix has a helix unbonded free length that is less than about two times a helix outer diameter. The approach is particularly suitable for miniature motors and their driven components, wherein the motor output shaft has a shaft diameter of less than about 3 millimeters and the helix outer diameter is less than about 3 millimeters.

16 Claims, 2 Drawing Sheets

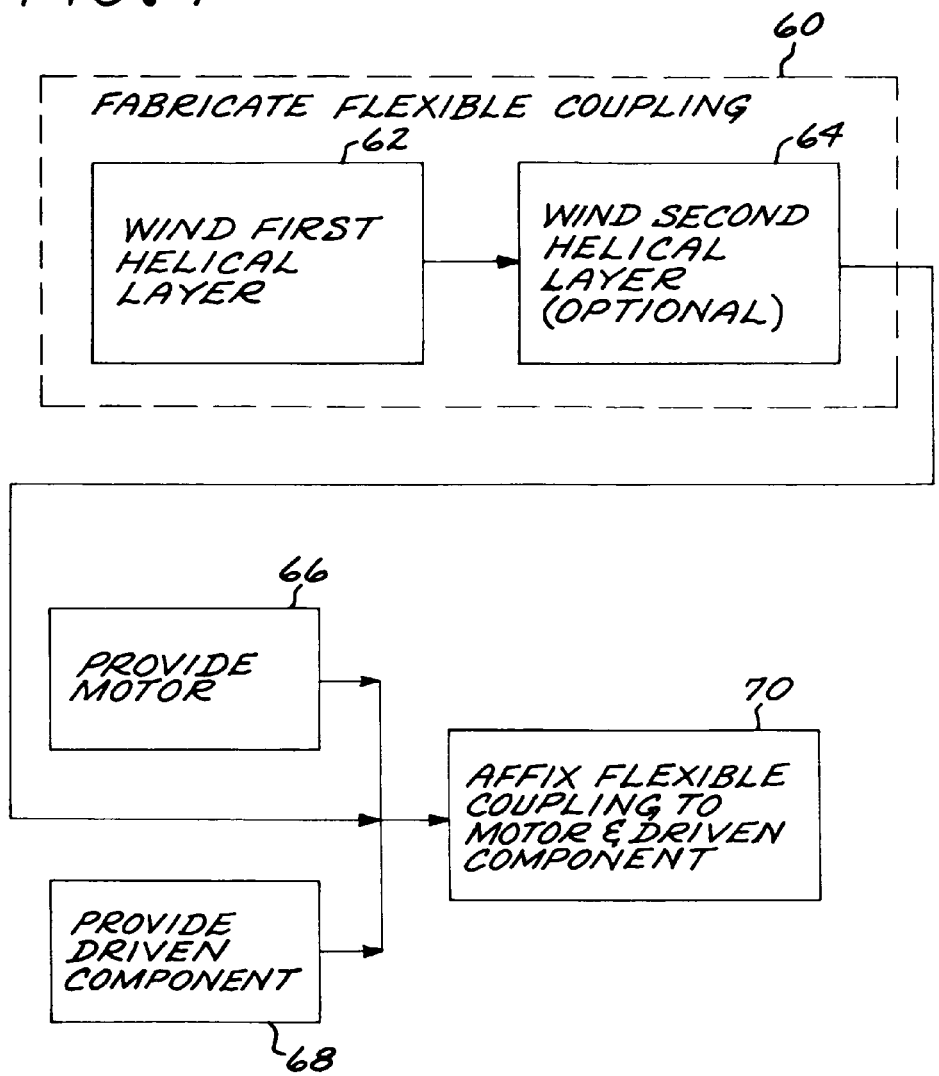

US 6,974,386 B1

MOTOR DRIVE SYSTEM WITH WIRE-WOUND FLEXIBLE COUPLING

This invention relates to a motor and the component that it drives and, more particularly, to a coupling between the motor output shaft and the driven component that absorbs the misalignment between the two.

BACKGROUND OF THE INVENTION

In a common form of a motor drive system, a motor produces a mechanical output, usually through a motor output shaft. The motor output shaft is mechanically linked to the driven component to transmit the mechanical output to the driven component. In principle, the motor and the driven component are perfectly aligned. In practice, however, there may be small misalignments either in the motor drive system as first assembled, or that develop during the course of service. The small misalignments may not be sufficiently large to cause the motor drive system to be inoperable, but they impose stresses on the motor and on the driven component that may damage bearings and other elements of the two devices.

A flexible coupling may be used between the motor output shaft and the driven component to transmit the power therebetween while flexing to accommodate misalignments between the motor output shaft and the driven component. The universal joint of an automobile drive train is a common example of a flexible coupling that allows the transmission of power between the motor and the driven wheels as the drive train misaligns during driving. In other circumstances, other types of flexible couplings such as bellows and spirally machined couplings are used.

While operable for many applications, the available flexible couplings are difficult or impossible to utilize for very small motor drive systems. For example, "micro-motors" with overall diameters of less than about 12 millimeters and shaft output diameters of less than about 3 millimeters are used in applications where driven components must be powered and the required power is low, and where the available size envelope is small. Optical fiber systems that employ multiple optical filters that must be mechanically moved into and out of an optical path are one such application. Universal joints and bellows cannot be economically manufactured in proportionately small sizes. The smallest economical universal joints and bellows are typically larger than the motors, and are also expensive to manufacture. Spirally machined couplings are made in this size range only with difficulty, and are also relatively expensive to fabricate.

There is a need for a mechanical flexible coupling that is suitable for use in small mechanical systems. The present invention fulfills this need, and further provides related advantages.

SUMMARY OF THE INVENTION

The present approach provides a mechanical flexible coupling that is particularly suitable for use in small-size, low-power motor drive systems. The flexible coupling of the present approach is readily and inexpensively produced in small sizes on the order of 3 millimeters diameter or smaller, comparable in size with the diameter of the motor output shaft of a micro-motor. The flexible coupling is easily interconnected with such a small motor output shaft and with the power inputs of comparably sized driven components.

In accordance with the invention, a motor drive system comprises a motor having a rotary motor output shaft, a driven component, and a flexible coupling connecting the motor output shaft to the driven component. The flexible coupling comprises a helix comprising a first wound wire. The helix is bonded at one end to the rotary motor output shaft and at the other end to the driven component. The helix has a helix unbonded free length, defined as the portion of the length of the helix that is between and not bonded to the rotary motor output shaft and the driven component, that is less than about twice a helix outer diameter.

The flexible coupling is particularly suited for coupling between a small motor, such as one with a shaft diameter of less than about 3 millimeters and sometimes as small as about 0.5 millimeters, and a comparably sized rotary-driven shaft of the driven component.

The motor may be of any operable type, with examples being an electrical motor or a pneumatic motor. The driven component may be of any operable type, with an example being a leadscrew that receives the rotary output of the motor output shaft and transforms that rotary output into a linear movement.

In the flexible coupling, the first wound wire preferably has a round cross section. The shape of the first wound wire is an important economic consideration. Many flexible couplings use a manufacturing technique that produces a spiral-element shape that is square or rectangular, and the non-circular shape of the spiral element is required to stabilize the operation of the flexible coupling. On the other hand, most commercially available wire is round in cross section. By utilizing round wire rather than a non-standard shape, the present approach reduces the costs associated with the provision of non-standard shapes.

In the preferred embodiment, the flexible coupling has no lateral constraint for the helix. Lateral constraints such as flexible cores or external tubes are used in most types of flexible shafts to prevent the flexible shaft from "snaking up", which is a mechanical buckling instability experienced when the helical shape is lost because too much power is transmitted through the flexible shaft. In the present approach, the small ratio of the helix unbonded free length-to-helix diameter of less than about 2 avoids such "snaking up" or buckling instability for moderate transmitted forces and torques, without the need for any lateral constraint.

The helix may be made of the first wound wire with a single lay to the wire. (The "lay" is the sense of the winding and advance of the wire that forms the helix, relative to the axis of the helix, and is usually expressed as a "right-hand lay" or a "left-hand lay".) When only a single-lay helix is used, the winding tends to unwrap when the motor is driven in the opposite sense. To overcome this characteristic, the helix may have two layers of windings of opposite lay. Thus, for example, a bi-directional flexible coupling includes the helix having a first helical layer formed of the first wound wire having a first lay, and a second helical layer overlying the first helical layer, wherein the second helical layer is formed of a second wound wire having a second lay opposite to the first lay. The two helical layers are each bonded to the rotary motor output shaft at one end of the helix and to the driven component at the other end of the helix, leaving the unbonded free length between the ends of the rotary motor output shaft and the driven component. Whether one layer, two layers, or more layers of wire are used to form the helix, the turns of wire that form each layer are desirably wound tightly in a side-by-side manner, rather than with laterally spaced-apart turns.

It is preferred that a ratio of the diameter of the first wound wire to the inner diameter of the helix be in the range of from about 1:1.5 to about 1:3 for most applications, although the ratio may be as high as 1:5 for light duty applications. For a two-layer helix with wires of the same diameters, it is preferred that the diameter of the wire in each layer be about half the value indicated by these ratios. This ratio of the diameter of the wire to the inner diameter of the helix produces a mechanically stable flexible coupling.

A method for making a motor drive system comprises the steps of providing a motor having a rotary motor output shaft, providing a driven component, fabricating a flexible coupling by winding a first wound wire into a helix as a first helical layer, wherein the helix has a helix unbonded free length that is less than about two times a helix outer diameter, and thereafter affixing a first end of the helix to the output shaft and a second end of the helix to the driven component. To form a bidirectional coupling, the step of fabricating includes the additional steps of winding a second wound wire overlying the first helical layer to form a second helical layer, wherein the second wound wire has a second lay opposite to the first lay (and the helix outer diameter is measured for the helix with both layers). Other compatible features discussed herein may be used in relation to the method.

The present approach provides for the coupling of two rotating shafts while accommodating any misalignment between the motor output and the driven component. The wound wire, short—short helix configuration is particularly suitable for making small couplings for use with small motors and driven components. The small coupling aids in keeping the size and weight of the motor drive system small.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a block diagram of a preferred approach for making a motor drive system.

DETAILED DESCRIPTION OF THE INVENTION

Figure 1:
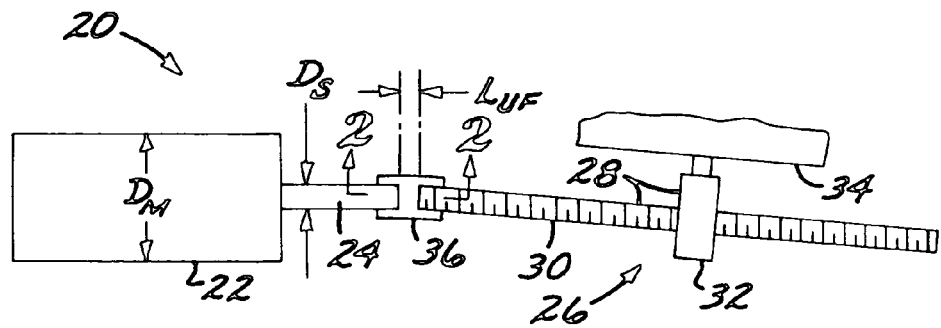
FIG. 1 is a schematic view of a motor drive system.

FIG. 1 schematically depicts a motor drive system 20 having a motor 22 with a rotary motor output shaft 24 and a driven component 26. The motor 22 has a motor diameter $D_M$ and a shaft diameter $D_S$. In a preferred application, $D_M$ is less than about 12 millimeters, and $D_S$ is less than about 3 millimeters and typically in the range of from about 0.5 to about 3 millimeters. In the pictured embodiment, the driven component 26 is a leadscrew drive 28 including a threaded leadscrew 30 which serves as a shaft of the driven component 26 that is driven and turned in a rotary manner by the rotary motor output shaft 24, a leadscrew follower 32 that moves along the length of the leadscrew 30 responsive to the turning of the leadscrew 30, and a driven article 34 that is affixed to the leadscrew follower 32. The leadscrew drive 28 converts the rotary movement of the output shaft 24 to linear movement of the driven article 34.

A flexible coupling 36 connects the motor output shaft 24 to the driven component 26, in this case to the leadscrew 30, so that the rotation of the motor output shaft 24 imparts rotary motion to the leadscrew 30. The flexible coupling 36 is affixed, preferably with an adhesive bond, at one end to the end of the motor output shaft 24, and is affixed, preferably with an adhesive bond, at the other end to the driven component 26 and specifically to the leadscrew 30.

Figure 2:
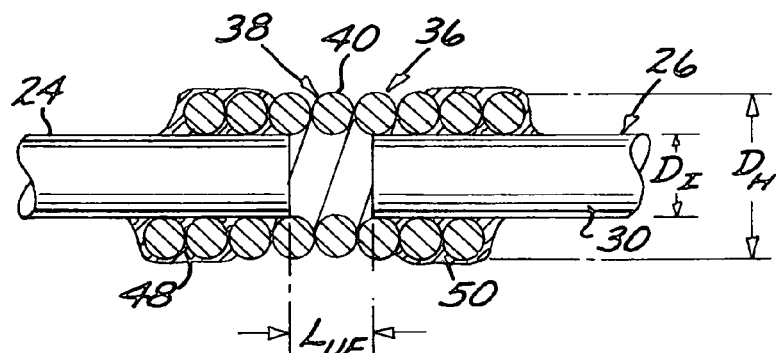
FIG. 2 is a sectional view of a first embodiment of the flexible coupling, taken on line 2—2 of FIG. 1.
Figure 3:
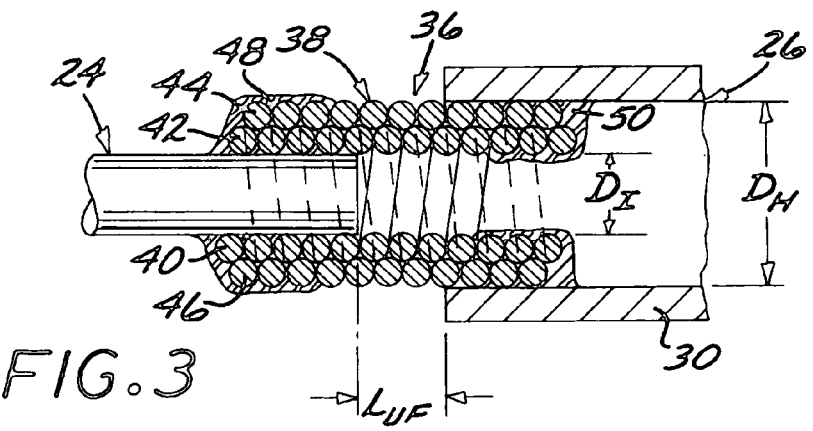
FIG. 3 is a sectional view of a second embodiment of the flexible coupling, taken on line 2—2 of FIG. 1 and with a different arrangement of the shafts as compared with those of FIG. 2.

Two preferred embodiments of the flexible coupling 36 are illustrated in greater detail in FIGS. 2–3. Either of these embodiments, or any other operable embodiment, may be used as the flexible coupling 36 in the motor drive system 20 of FIG. 1.

In the embodiment of FIG. 2, the flexible coupling 36 includes a helix 38 formed of a first wound wire 40 cylindrically wound around a helical axis. The direction of winding of the first wound wire 40, the "lay" of the first wound wire 40, selected to be the same as the direction of rotation of the rotary motor output shaft 24 when power is transmitted through the rotary motor output shaft 24 to the driven component 26. (The "lay" is the sense of the winding and advance of the wire that forms the helix, relative to the axis of the helix, and is usually expressed as a "right-hand lay" or a "left-hand lay".) The helix 38 has a helix unbonded free length $L_{UF}$ that is less than about two times a helix outer diameter $D_H$. $D_H$ is preferably less than about 4 millimeters, more preferably less than about 3 millimeters, most preferably less than about 2.5 millimeters, and typically in the range of from about 0.5 to about 3 millimeters. That is, the helix 38 is a "short" helix, whose purpose is not to serve as a flexible shaft to transmit the motor power over long distances and around obstacles. Instead, the flexible coupling 36 serves as a short coupling whose function is to negate the effect of misalignment between the rotary motor output shaft 24 and the driven component 26, and to transmit the motor power over a relatively short distance. The misalignment is typically small, on the order of about 2 degrees or less.

The short helix configuration aids in mechanically stabilizing the flexible coupling 36 by avoiding any buckling instability of the helix 38 when mechanical power is transmitted through it from the rotary motor output shaft 24 to the driven component 26. Consequently, no lateral constraint of the helix 38 is required, apart from the structural rigidity of the helix itself. In some prior flexible shafts whose unbonded free lengths are much longer than the present helix, in relation to the diameter of the helix, there is a flexible central core structure or a lateral tubular support around the flexible shaft, to prevent snaking mechanical instability of the flexible shaft. Such a lateral constraint is not needed or desired in the present approach, although it could be used in some cases.

The embodiment of FIG. 2 is useful in those cases where the power is to be transmitted only when the rotary motor output shaft 24 rotates in a single direction having the same sense as the lay of the first wound wire 40, which is useful in some applications but not, for example, in the case of the leadscrew drive 28 as the driven component 26. In the embodiment of FIG. 2, if there is an attempt to reverse the movement of the leadscrew follower 32 by reversing the direction of the rotation of the rotary motor output shaft 24, the first wound wire 40 of the helix 38 unwinds, because its adjacent turns are not bonded to each other.

The embodiment of FIG. 3 is suited for applications in which power must be transmitted from the rotary motor output shaft 24 to the driven component 26, whatever the direction of rotation of the rotary motor output shaft 24. In the embodiment of FIG. 3, the first wound wire 40 forms a first helical layer 42 having a first lay. A second helical layer 44 overlies the first helical layer 42. The second helical layer 44 is formed of a second wound wire 46 having a second lay opposite to the first lay. For example, if the first helical layer 42 has a left-hand lay, then the second helical layer 44 has a right-hand lay, or vice versa.

In either the embodiment of FIG. 2 or the embodiment of FIG. 3, the motor output shaft 24 is mechanically connected to one end of the helix 38 with a first connection 48, and the driven component is mechanically connected to the opposite end of the helix 38 with a second connection 50. The mechanical connections 48 and 50 are preferably made with a permanent or temporary adhesive material. The mechanical connections 48 and 50 are preferably made in an axial manner, so that the motor output shaft 24 and the driven component 26 are axially aligned with the respective ends of the helix 38 of the flexible coupling 36. The mechanical connections 48 and 50 may both be made with both of the shafts 24 and 26 affixed to the inside the helix 38 (as in FIG. 2), both of the shafts 24 and 26 affixed to the outside of the helix 38, or one of the shafts 24 affixed to the inside and the other of the shafts 26 affixed to the outside of the helix 38 (as in FIG. 3).

The outer diameter $D_H$ and the overall length $L_{UF}$ of the helix 38 are selected according to the particular application, but within the constraints discussed above. The first wound wire 40 and the second wound wire 46 (where used) are preferably a high-strength steel material such as steel piano wire. The first wound wire 40 and the second wound wire 46 may be of the same or different materials, and the second wound wire 46 may simply be a further length of the first wound wire 40 that is wrapped with the opposite lay. The first helical layer 42 and the second helical layer 44 may be single layers of the respective wires, or multiple separated or interleaved layers. The first wound wire 40 and the second wound wire 46 are preferably each of a round cross section, as that is the form more readily available commercially and least expensive commercially.

The diameter of the first wound wire 40 and, if used, the second wound wire 46, are related to an inner diameter $D_I$ of the helix 38. Generally, the larger the inner diameter $D_I$, the larger the diameter of the wound wire 40, 46 to improve the buckling resistance of the helix 38 and thereby the ability of the flexible coupling 36 to carry higher loading torques. However, the wound wire 40, 46 cannot be of such a large diameter that it cannot be wound to the required diameter of the helix 38. It is preferred that a ratio of the diameter of the first wound wire 40 to the inner diameter of the helix $D_I$ be in the range of from about 1:1.5 to about 1:3 for most applications, although the ratio may be as high as 1:5 for light duty applications. For a two-layer helix with wires 40, 46 of the same diameters, it is preferred that the diameter of the wire 40, 46 in each layer 42, 44 be about half the value indicated by these proportions. This ratio of the diameter of the wire to the inner diameter of the helix produces a mechanically stable flexible coupling. In an example, for a helix inner diameter of about 1.2 millimeters, corresponding to a motor output shaft diameter of about 1.2 millimeters, the wound wire 40 is a high-strength round steel wire having a diameter of about 0.4–0.5 millimeters for a single layer helix 38, or about 0.2–0.3 millimeters for each wire 40, 46 of the two-layer helix 38 of opposite lays.

FIG. 4 depicts a preferred method for making the motor drive system 20. The flexible coupling 36 is first fabricated, step 60, by winding the first wound wire 40 into the form of the helix 38, typically on a winding mandrel, as the first helical layer 42 (or only helical layer in the event that no second helical layer is used), step 62. If the second helical layer 44 is to be used as well, it is wound with the second wound wire 46 overlying the first helical layer 44 with the opposite lay, step 64. The pitch of the second wound wire 46 may be the same as, or different than, the pitch of the first wound wire 38. The helix 38 is wound so that the helix unbonded free length $L_{UF}$ is less than about two times the helix outer diameter DH. The motor 22 having the rotary motor output shaft 24 is provided, step 66, and the driven component 26 is provided, step 68. The motor 22 and the driven component 26 are typically provided as completed subassemblies. A first end of the helix 38 is affixed to the rotary motor output shaft 24, and a second end of the helix 38 is affixed to the driven component 26, step 70, to complete the motor drive system 20.

The motor drive system 20 has been prepared and operated for each of the embodiments of the flexible coupling 36 of FIGS. 2 and 3, and found to operate satisfactorily.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A motor drive system comprising:
    a motor having a rotary motor output shaft;
    a driven component; and
    a flexible coupling connecting the motor output shaft to the driven component, wherein the flexible coupling comprises a helix comprising a first wound wire, wherein a first end of the helix is adhesively bonded to the rotary motor output shaft and a second end of the helix is adhesively bonded to the driven component, and wherein the helix has a helix unbonded free length that is less than about two times a helix outer diameter.

2. The motor drive system of claim 1, wherein the motor output shaft has a shaft diameter of less than about 3 millimeters.

3. The motor drive system of claim 1, wherein the helix outer diameter is less than about 3 millimeters.

4. The motor drive system of claim 1, wherein the driven component comprises a leadscrew.

5. The motor drive system of claim 1, wherein the first wound wire has a round cross section.

6. The motor drive system of claim 1, wherein the flexible coupling has no lateral constraint for the helix.

7. The motor drive system of claim 1, wherein the helix comprises
    a first helical layer formed of the first wound wire having a first lay, and
    a second helical layer overlying the first helical layer, wherein the second helical layer is formed of a second wound wire having a second lay opposite to the first lay.

8. The motor drive system of claim 1, wherein the helix comprises
    a first helical layer formed of the first wound wire having a first lay, and
    a second helical layer overlying the first helical layer, wherein the second helical layer is formed of a second wound wire having a second lay opposite to the first lay, the motor output shaft is mechanically connected to both the first helical layer and the second helical layer, and the driven component is mechanically connected to both the first helical layer and the second helical layer.

9. A motor drive system comprising:
   a motor having a rotary motor output shaft with a shaft diameter of less than about 3 millimeters;
   a leadscrew driven component; and
   a flexible coupling connecting the motor output shaft to the driven component, wherein the flexible coupling comprises a helix comprising a first wound wire of round cross section, wherein the helix outer diameter is less than about 3 millimeters, wherein the helix has a helix unbonded free length that is less than about two times a helix outer diameter, and wherein the flexible coupling has no lateral constraint for the helix.

10. The motor drive system of claim 9, wherein the helix comprises
   a first helical layer formed of the first wound wire having a first lay, and
   a second helical layer overlying the first helical layer, wherein the second helical layer is formed of a second wound wire having a second lay opposite to the first lay.

11. The motor drive system of claim 9, wherein the helix comprises
   a first helical layer formed of the first wound wire having a first lay, and
   a second helical layer overlying the first helical layer, wherein the second helical layer is formed of a second wound wire having a second lay opposite to the first lay, the motor output shaft is mechanically connected to both the first helical layer and the second helical layer, and the driven component is mechanically connected to both the fist helical layer and the second helical layer.

12. The motor drive system of claim 1, wherein the helix comprises
   a first helical layer formed of the first wound wire having a first lay, wherein the first wound wire has a round cross section, and
   a second helical layer overlying the first helical layer, wherein the second helical layer is formed of a second wound wire having a second lay opposite to the first lay, and wherein the second wound wire has a round cross section.

13. The motor drive system of claim 1, wherein the helix comprises
   a first helical layer formed of the first wound wire having a first lay, wherein the first wound wire has a round cross section, and
   a second helical layer overlying the first helical layer, wherein the second helical layer is formed of a second wound wire having a second lay opposite to the first lay, the second wound wire has a round cross section, the motor output shaft is mechanically connected to both the first helical layer and the second helical layer, and the driven component is mechanically connected to both the first helical layer and the second helical layer.

14. The motor drive system of claim 9, wherein the helix comprises
   a first helical layer formed of the first wound wire having a first lay, and
   a second helical layer overlying the first helical layer, wherein the second helical layer is formed of a second wound wire having a second lay opposite to the first lay, and wherein the second wound wire has a round cross section.

15. The motor drive system of claim 9, wherein the helix comprises
   a first helical layer formed of the first wound wire having a first lay, and
   a second helical layer overlying the first helical layer, wherein the second helical layer is formed of a second wound wire having a second lay opposite to the first lay, the second wound wire has a round cross section, the motor output shaft is mechanically connected to both the first helical layer and the second helical layer, and the driven component is mechanically connected to both the first helical layer and the second helical layer.

16. The motor drive system of claim 9, wherein
   a first end of the helix is adhesively bonded to the rotary motor output shaft, and
   a second end of the helix is adhesively bonded to the driven component.

* * * * *